US011959757B2

(12) United States Patent
Sameer

(10) Patent No.: US 11,959,757 B2
(45) Date of Patent: Apr. 16, 2024

(54) METHOD, APPARATUS, AND SYSTEM FOR PREDICTING DAMAGE AREA ZONES FOR A VEHICLE TO AVOID IN CASE OF AN ACCIDENT

(71) Applicant: HERE Global B.V., Eindhoven (NL)

(72) Inventor: Priyank Sameer, Mumbai (IN)

(73) Assignee: HERE GLOBAL B.V., Eindhoven (NL)

( * ) Notice: Subject to any disclaimer, the term of this patent is extended or adjusted under 35 U.S.C. 154(b) by 665 days.

(21) Appl. No.: 17/127,317

(22) Filed: Dec. 18, 2020

(65) Prior Publication Data
US 2022/0196415 A1    Jun. 23, 2022

(51) Int. Cl.
| G01C 21/34 | (2006.01) |
| G01S 19/01 | (2010.01) |
| G06N 5/02  | (2023.01) |
| G06Q 50/16 | (2012.01) |
| G06V 20/58 | (2022.01) |

(52) U.S. Cl.
CPC .......... G01C 21/3461 (2013.01); G01S 19/01 (2013.01); G06N 5/02 (2013.01); G06Q 50/16 (2013.01); G06V 20/58 (2022.01)

(58) Field of Classification Search
CPC ...... G01C 21/3461; G01S 19/01; G06N 5/02; G06N 20/00; G06Q 50/16; G06V 20/58; G06V 20/56
See application file for complete search history.

(56) References Cited

U.S. PATENT DOCUMENTS

| 8,682,699 | B2 | 3/2014 | Collins et al. |
| 8,825,277 | B2 | 9/2014 | McClellan et al. |
| 9,587,952 | B1 | 3/2017 | Slusar |
| 10,217,169 | B2 | 2/2019 | Schumann, Jr. et al. |
| 10,247,565 | B2 | 4/2019 | Nepomuceno et al. |
| 2017/0234689 | A1* | 8/2017 | Gibson ................ G05D 1/0061 701/25 |
| 2017/0236210 | A1* | 8/2017 | Kumar .................. G06Q 40/08 705/4 |
| 2020/0018613 | A1* | 1/2020 | Stenneth ................ G08G 1/048 |

OTHER PUBLICATIONS

Zheng et al, All Accidents are Not Equal: Using Geographically Weighted Regressions Models to Assess and Forecast Accident Impacts, Google Scholar, 3rd International Conference on Road Safety and Simulation, Sep. 2011, pp. 1-13. (Year: 2011).*

* cited by examiner

Primary Examiner — Russell Frejd

(57) ABSTRACT

An approach is disclosed for predicting damage area zones for a vehicle to avoid in case of an accident. The approach involves, for example, retrieving property cost data associated with one or more map features of a geographic area. The approach also involves determining at least one damage area zone in the geographic area based on the property cost data, wherein the at least one damage area zone indicates a zone within the geographic area associated with a property damage value predicted to result from an accident occurring in the zone based on the property cost data. The approach further involves providing the at least one damage area zone as a digital channel output of a geographic database.

13 Claims, 10 Drawing Sheets

100

METHOD, APPARATUS, AND SYSTEM FOR PREDICTING DAMAGE AREA ZONES FOR A VEHICLE TO AVOID IN CASE OF AN ACCIDENT

BACKGROUND

Location-based service providers (e.g., mapping and navigation providers) are continually challenged to provide compelling services and applications. One area of interest relates to developing localization techniques to ensure the safe operation of vehicles (e.g., autonomous vehicles, highly assisted driving (HAD) vehicles, semi-autonomous vehicles, etc.) at lane-level accuracy or better. Safe operations of such vehicles generally require highly accurate maps (e.g., digital maps) and sophisticated location-based sensors (e.g., global positioning system (GPS) sensors, Light Detection and Ranging (LiDAR) sensors, etc.) so that navigation systems can generate lane-level routing. Despite all the available information and technology, accidents can still occur (e.g., due to driver or passenger error, other drivers/vehicles, pedestrians, etc.) and such accidents can be very costly in terms of property damage, vehicle damage, and/or bodily harm in the worst-case scenario. Accordingly, service providers face significant technical challenges to minimize damages associated with driving accidents.

SOME EXAMPLE EMBODIMENTS

Therefore, there is a need for an approach for minimizing damages associated with driving accidents.

According to one embodiment, a method comprises retrieving property cost data associated with one or more map features of a geographic area. The method also comprises determining at least one damage area zone in the geographic area based on the property cost data, wherein the at least one damage area zone indicates a zone within the geographic area associated with a property damage value predicted to result from an accident occurring in the zone based on the property cost data. The method further comprises providing the at least one damage area zone as a digital channel output of a geographic database.

According to another embodiment, an apparatus comprises at least one processor, and at least one memory including computer program code for one or more computer programs, the at least one memory and the computer program code configured to, with the at least one processor, cause, at least in part, the apparatus to retrieve property cost data associated with one or more map features of a geographic area. The apparatus is also caused to determine at least one damage area zone in the geographic area based on the property cost data, wherein the at least one damage area zone indicates a zone within the geographic area associated with a property damage value predicted to result from an accident occurring in the zone based on the property cost data. The apparatus is further caused to provide the at least one damage area zone as a digital channel output of a geographic database.

According to another embodiment, a non-transitory computer-readable storage medium having stored thereon one or more program instructions which, when executed by one or more processors, cause, at least in part, an apparatus to retrieve property cost data associated with one or more map features of a geographic area. The apparatus is also caused to determine a maximum damage zone, a minimum damage zone, or a combination thereof in the geographic area based on the property cost data, wherein the maximum damage zone, the minimum damage zone, or a combination thereof indicates a zone within the geographic area associated with a property damage value predicted to result from an accident occurring in the zone based on the property cost data. The apparatus is further caused to provide the maximum damage zone, the minimum damage zone, or a combination thereof as a digital channel output of a geographic database.

According to another embodiment, an apparatus comprises means for retrieving property cost data associated with one or more map features of a geographic area. The apparatus also comprises means for determining at least one damage area zone in the geographic area based on the property cost data, wherein the at least one damage area zone indicates a zone within the geographic area associated with a property damage value predicted to result from an accident occurring in the zone based on the property cost data. The apparatus further comprises means for providing the at least one damage area zone as a digital channel output of a geographic database.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for predicting damage area zones for a vehicle to avoid in case of an accident are disclosed. In the following description, for the purposes of explanation, numerous specific details are set forth to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form to avoid unnecessarily obscuring the embodiments of the invention.

Figure 1:
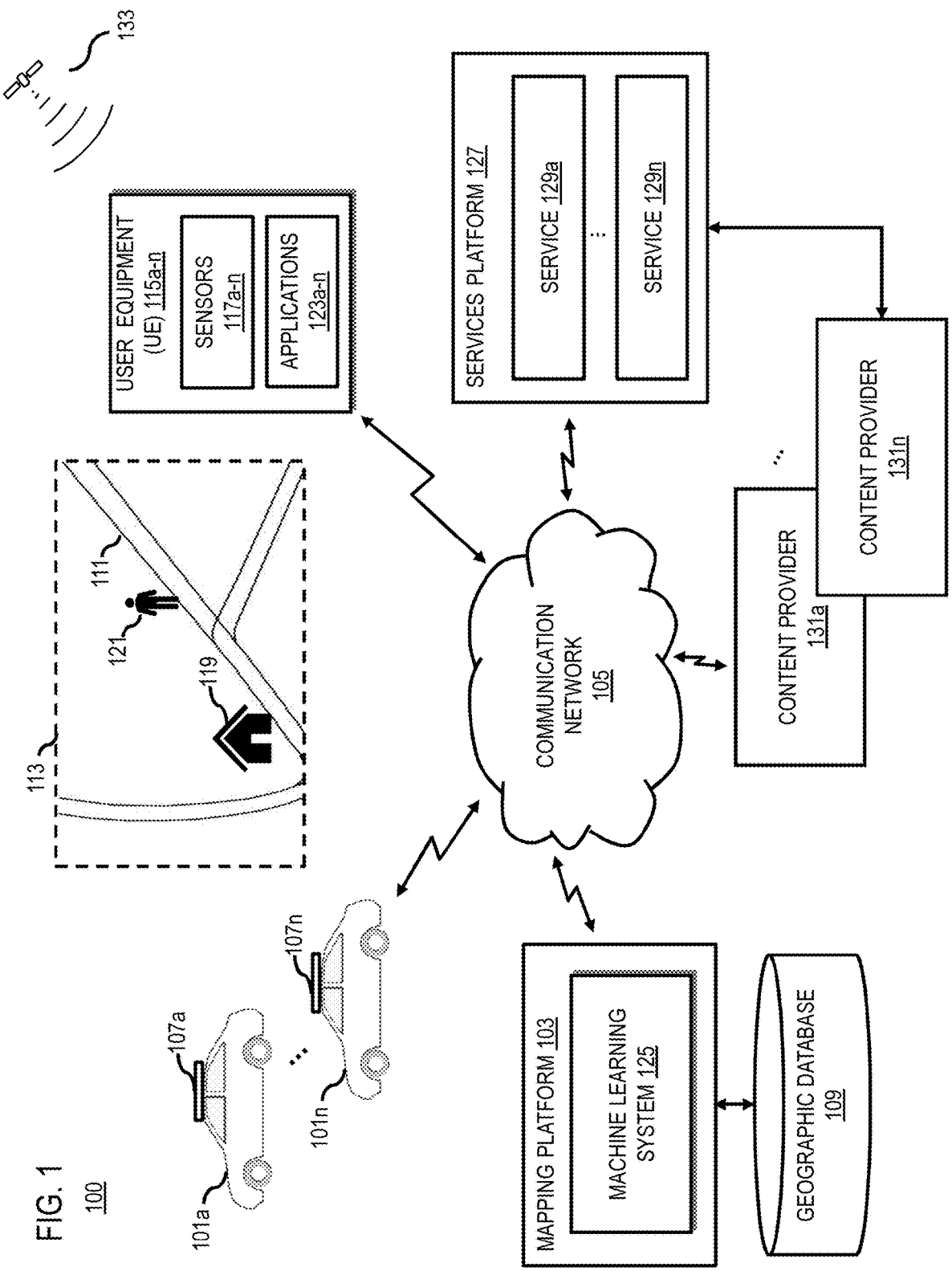
FIG. 1 is a diagram of a system capable of predicting damage area zones for a vehicle to avoid in case of an accident, according to example embodiment(s)

FIG. 1 is a diagram of a system capable of predicting damage area zones for a vehicle to avoid in case of an accident to minimize damages, according to example embodiment(s). As described above, location-based service providers (e.g., mapping and navigation providers) are continually challenged to provide compelling services and applications. One area of interest relates to developing localization techniques to ensure the safe operation of vehicles (e.g., autonomous vehicles, HAD vehicles, semi-autonomous vehicles, etc.) at an accuracy level sufficient to support autonomous driving (e.g., lane-level accuracy or better). Safe operations of such vehicles generally require highly accurate maps (e.g., digital maps) and sophisticated location-based sensors (e.g., GPS sensors, LiDAR sensors, etc.) so that navigation systems can generate lane-level routing. Despite all the information and technology available, accidents can still occur (e.g., due to human error, other drivers/vehicles, pedestrians, etc.) and such accidents can be very costly in terms of property damage, vehicle damage, and/or bodily harm in the worst-case scenario. For example, around one-third of all accidents are caused by driver negligence such as speeding, falling asleep, distracted driving, recklessness, or inexperience. Accordingly, service providers face significant technical challenges to minimize damage costs associated with driving accidents.

To address these technical problems, a system 100 of FIG. 1 introduces a capability to predict damage area zones for a vehicle to avoid in case of an accident, according to example embodiment(s). In one embodiment, the system 100 can collect information or data about vehicles, property, and/or pedestrians on or proximate to one or more roads or links that a vehicle (e.g., an autonomous vehicle, a HAD vehicle, a semi-autonomous vehicle, etc.) is driving or traveling or plans to drive or travel at a given time. In one instance, the system 100 can collect vehicle cost information which can be used in live scenarios as well as for all nearby vehicles (e.g., luxury vehicles, average vehicles, etc.); property costs (e.g., structures, historical monuments/landmarks, buildings, shops, poles, signs, billboards, etc.); and/or pedestrian information to generate or to build a digital map including predicted minimal/maximum damage areas that a user (e.g., a driver, a vehicle fleet manager, a software programmer, etc.) and/or a vehicle (e.g., an autonomous vehicle) can utilize to minimize and/or to avoid high property damages in case of a vehicle accident.

In one embodiment, the system 100 of FIG. 1 includes one or more vehicles 101a-101n (also collectively or individually referred to as vehicles 101 or a vehicle 101, respectively) (e.g., standard vehicles, autonomous vehicles, HAD vehicles, semi-autonomous vehicles, etc.) having connectivity to a mapping platform 103 via the communication network 105 and including or equipped with one or more vehicle sensors 107a-107n (also collectively referred to as vehicle sensors 107) (e.g., camera sensors, GPS sensors, LiDAR sensors, etc.). In one instance, the system 100 can collect information or data (e.g., stored in or accessible via the geographic database 109) for each vehicle 101 on or along a road or link 111 of a given area (e.g., represented by the digital map 113) by processing probe or sensor data (e.g., GPS data) generated and/or transmitted by the vehicle sensors 107 (e.g., GPS sensors). In one instance, the probe data may be reported as probe points, which are individual data records collected at a point in time that records telemetry data for that point in time. A probe point can include attributes such as: (1) probe ID, (2) longitude, (3) latitude, (4) heading, (5) speed, and (6) time.

In one instance, based on a vehicle 101's probe ID, the system 100 can extract respective information or data (e.g., cost or current value information) from information or data stored in or accessible via the geographic database 109 to determine which vehicles 101 if involved in an accident, will likely result in relatively high damage costs and which vehicles 101 if involved in an accident, will likely result in the relatively low damage costs. In one instance, the system 100 can predict the respective damage based on the vehicle 101's strength and/or durability (e.g., based on a make, model, one or more contextual factors, or a combination thereof). By way of example, the one or more contextual factors may include a vehicle 101's age, condition, maintenance record, etc.

In one embodiment, the system 100 includes one or more user equipment (UE) 115*a*-115*n* (also collectively or individually referred to as UEs 115 or a UE 115, respectively) (e.g., a mobile device, a smartphone, etc.) having connectivity to the mapping platform 103 via the communication network 105. In one instance, the UEs 115 can be associated with a user, a vehicle 101, or a combination thereof. In one instance, the UEs 115 include one or more device sensors 117 (also collectively or individually referred to as device sensors 117 or a device sensor 117, respectively) (e.g., camera sensors, GPS sensors, LiDAR sensors, etc.). In one instance, the system 100 can collect respective vehicle information or data (e.g., stored in or accessible via the geographic database 109) based on camera or sensor data collected from the device sensors 117. For example, the system 100 can collect information or data for a vehicle 101 based on one or more photos or videos of a vehicle 101 taken by the device sensors 117 (e.g., a camera sensor) and then matched by the system 100 with one or more existing photos or videos stored in or accessible via the geographic database 109 and linked with a vehicle 101 (e.g., based on metadata).

In one embodiment, the system 100 can collect information or data (e.g., stored in or accessible via the geographic database 109) associated with one or more properties 119*a*-119*n* (also referred to collectively or individually as properties 119 or a property 119, respectively) on or near a road or a link 111 of the digital map 113 based on probe or sensor data (e.g., GPS data) generated and/or transmitted by vehicle sensors 107, device sensors 117, or a combination thereof in proximity to the property 119 (e.g., driving by, walking by, located within, etc.). In one instance, the system 100 can process the probe or sensor data to generate a property ID. By way of example, the properties 119 may include a home, a structure, a historical monument/landmark, a building, a shop, a pole, a sign, a billboard, etc. In one instance, the system 100 can determine the property ID based on location information (e.g., longitude and latitude), place of interest (POI) information or data, or a combination thereof associated with the property 119.

In one instance, based on the respective property ID, the system 100 can extract information or data about the property 119 (e.g., cost or current value information) from corresponding information or data stored in or accessible via the geographic database 109 to determine which properties 119 will likely result in relatively high damage costs if involved in an accident and which properties 119 will likely result in relatively low damage costs if involved in an accident. In one instance, the system 100 can predict the damage costs based on building materials, one or more contextual factors (e.g., age, wear and tear, historical significance, etc.), or a combination thereof.

In one embodiment, the system 100 can collect information or data (e.g., stored in or accessible via the geographic database 109) for one or more people 121*a*-121*n* (e.g., also referred to collectively as people 121 or a person 121 (e.g., a pedestrian, a home owner, a shopkeeper, an occupant of a property 119, etc.) on or near a road or a link 111 based on probe or sensor data (e.g., GPS data) generated and/or transmitted by vehicle sensors 107, device sensors 117, or a combination thereof in proximity to the person 121 (e.g., driving by, walking by, associated with, etc.). In one instance, the system 100 can process the probe or sensor data to generate a person ID for each person 121.

In one instance, based on the respective individual ID, the system 100 can extract information or data about the people 121 from corresponding information or data stored in or accessible via the geographic database 109 to determine which people 121 will likely result in relatively high damage costs if involved in an accident and which people 121 will likely result in relatively low damage costs if involved in an accident. In one instance, the corresponding information or data stored in or accessible via the geographic database 109 may be based on an individual current worth or actuarial value, a representative worth or value, or a combination thereof.

In one embodiment, the system 100 can use the information or data (e.g., stored in or accessible via the geographic database 109) for the vehicles 101, the properties 119, and/or the people 121 to generate one or more spots on the digital map 113 where relatively low damage costs are likely based on a vehicle 101 accident, where relatively high damage costs are likely based on a vehicle 101 accident, or a combination thereof. In one instance, the UEs 115 include one or more applications 123*a*-123*n* (also collectively or individually referred to as applications 123 or an application 123, respectively) (e.g., a navigation or mapping application, an augmented reality (AR) or virtual reality (VR) application, or a combination thereof) that the system 100 can use to display the one or more spots on the digital map 113 directly (e.g., via a navigation application). In one embodiment, the system 100 can use the information or data for routing and guidance of autonomous vehicles 101. For example, the system 100 can route autonomous vehicles 101 away from one or more areas include one or more vehicles 101, properties 119, and/or people 121 where the system 100 predicts relatively high damage costs are likely during an accident. In one instance, the system 100 can route autonomous vehicles 101 away from such zones ahead of time or it can direct the autonomous vehicles 101 to take an evasive action (e.g., turn wheels in the opposite direction) in response to an accident.

In one instance, the system 100 can use all this information in the digital channel for predicting/providing minimal/maximum damage area zones in maps (e.g., the digital map 113, applications 123, or a combination thereof) to avoid high property damages during accidents. In one instance, the system 100 can enable a user (e.g., a municipality, a safety or software engineer, etc.) to use the digital map 113 with the damage area zones to analyze the effect of various road safety precautions (e.g., one-way traffic, no parking, etc.). In one instance, the system 100 can use the one or more damage area zones to generate one or more routes (e.g., for autonomous vehicles 101) based on the property 119 costs, vehicle 101 costs, and/or people 121 costs to determine a relatively safe route for a vehicle 101 to navigate between various points on the digital map 113.

Figure 2:
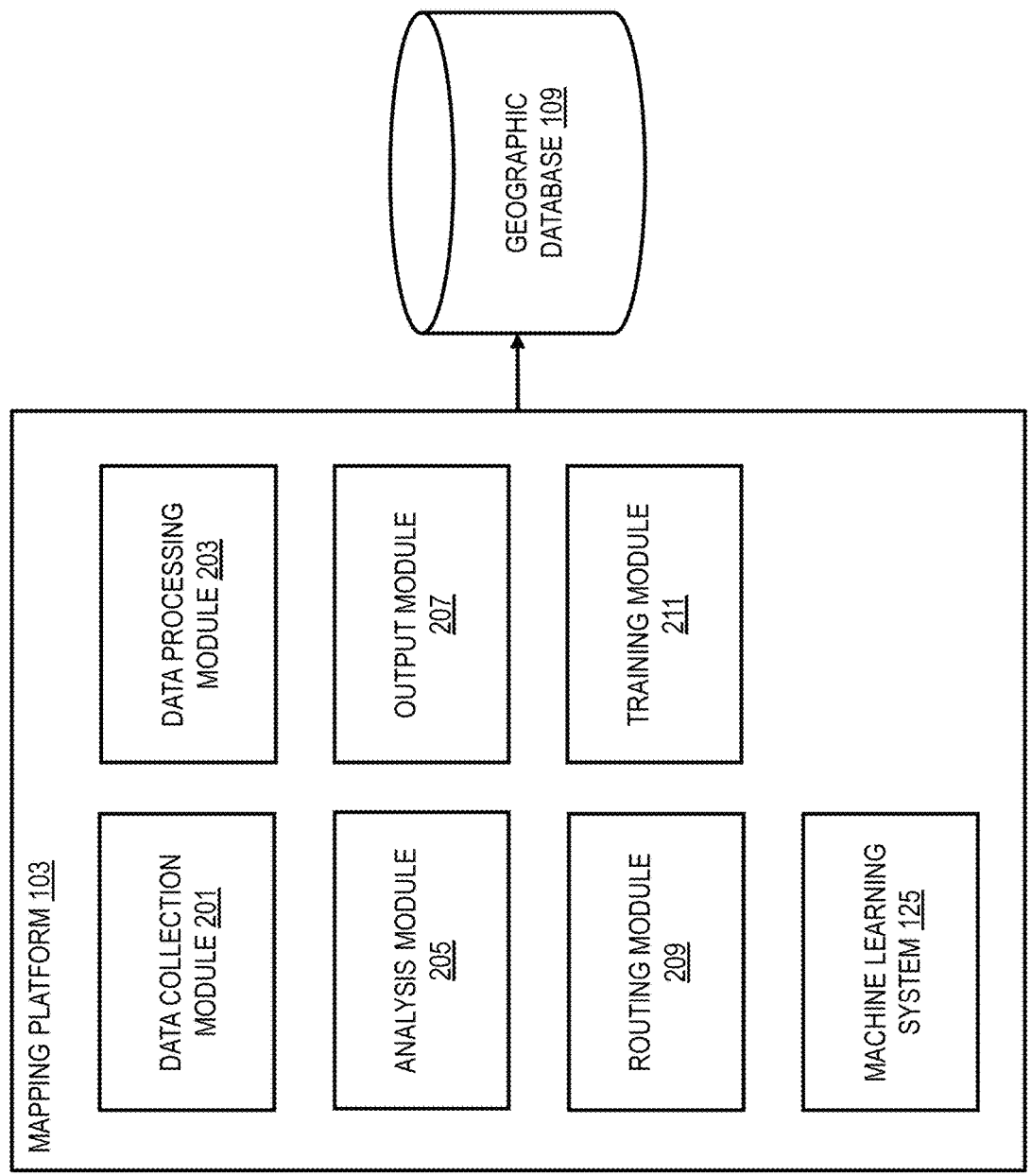
FIG. 2 is a diagram of the components of a mapping platform capable of predicting damage area zones for a vehicle to avoid in case of an accident, according to example embodiment(s)

FIG. 2 is a diagram of the components of the mapping platform 103, according to example embodiment(s). By way of example, the mapping platform 103 includes one or more components for predicting damage area zones for a vehicle to avoid in case of an accident, according to the example embodiment(s) described herein. It is contemplated that the functions of these components may be combined or performed by other components of equivalent functionality. In one embodiment, the mapping platform 103 includes a data collection module 201, a data processing module 203, an analysis module 205, an output module 207, a routing module 209, a training module 211, and the machine learning system 125, and has connectivity to the geographic database 109. The above presented modules and components of the mapping platform 103 can be implemented in hardware, firmware, software, or a combination thereof. Though depicted as a separate entity in FIG. 1, it is contemplated that the mapping platform 103 may be implemented as a module of any other component of the system 100. In another embodiment, the mapping platform 103, the machine learning system 125, and/or the modules 201-211 may be implemented as a cloud-based service, local service, native application, or combination thereof. The functions of the mapping platform 103, the machine learning system 125, and/or the modules 201-211 are discussed with respect to FIG. 3.

Figure 3:
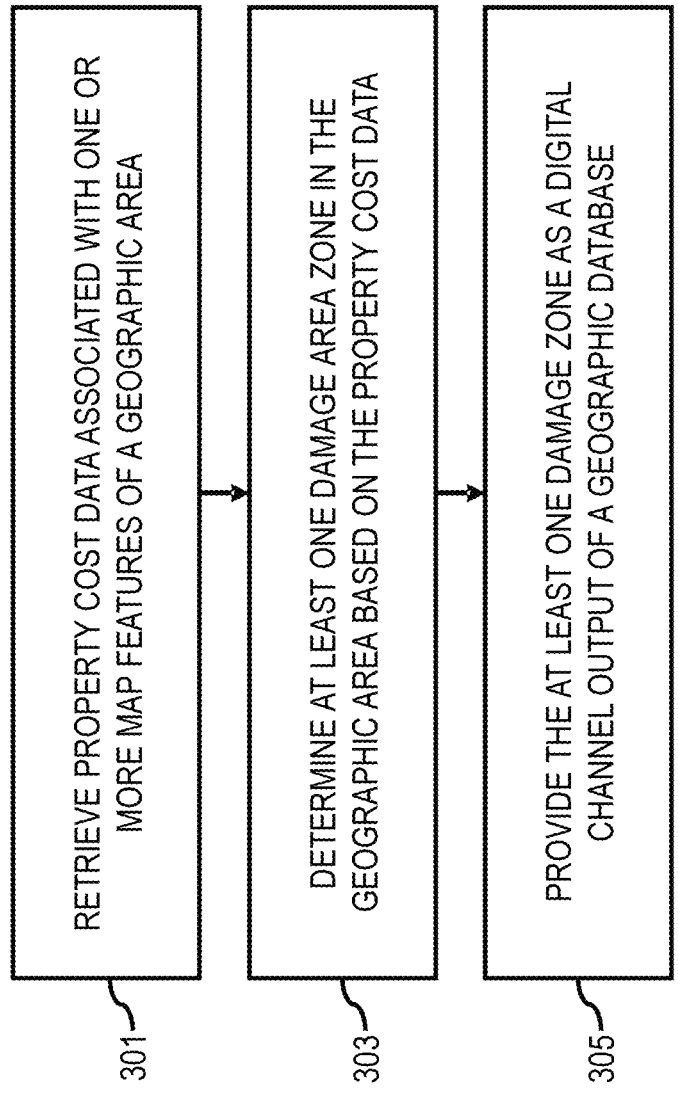
FIG. 3 is a flowchart of a process for predicting damage area zones for a vehicle to avoid in case of an accident, according to example embodiment(s)
Figure 7:
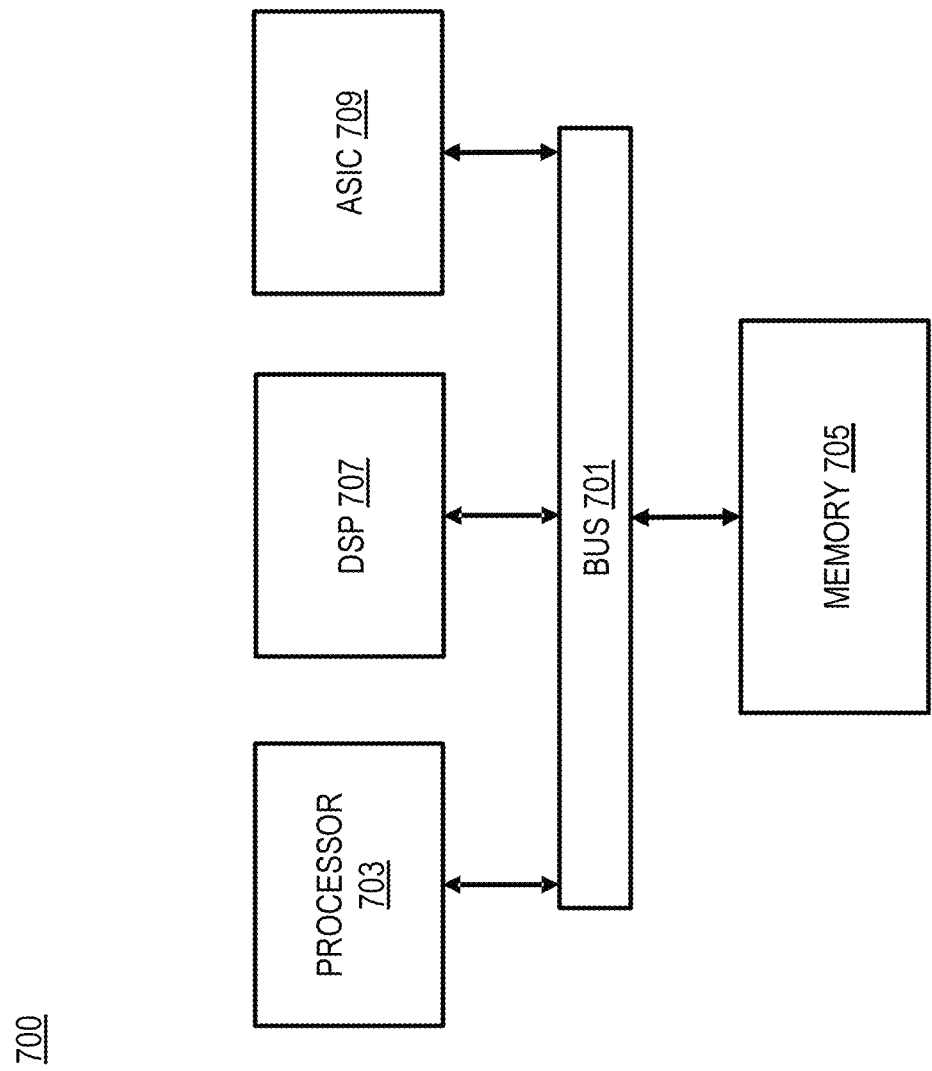
FIG. 7 is a diagram of a chip set that can be used to implement example embodiment(s)

FIG. 3 is a flowchart of a process for predicting damage area zones for a vehicle to avoid in case of an accident, according to example embodiment(s). In various embodiments, the mapping platform 103, the machine learning system 125, and/or any of the modules 201-211 may perform one or more portions of the process 300 and may be implemented in, for instance, a chip set including a processor and a memory as shown in FIG. 7. As such, the mapping platform 103, the machine learning system 125, and/or the modules 201-211 can provide means for accomplishing various parts of the process 300, as well as means for accomplishing embodiments of other processes described herein in conjunction with other components of the system 100. Although the process 300 is illustrated and described as a sequence of steps, its contemplated that various embodiments of the process 300 may be performed in any order or combination and need not include all the illustrated steps.

In step 301, the data collection module 201 can retrieve property cost data associated with one or more map features of a geographic area. In one embodiment, the one or more map features (e.g., properties 119) can comprise homes, structures, historical monuments/landmarks, buildings, shops, poles, signs, billboards, etc., essentially any physical structure or non-transitory object that is located on, along, or nearby one or more roads or links (e.g., a road or a link 111) of a geographic area (e.g., as represented by the digital map 113). In one instance, the geographic area represents an area where one or more vehicles (e.g., vehicles 101) can travel based on user input (e.g., a person 121 driving), autonomously (e.g., based on a routing and/or navigation application 123), or a combination thereof (e.g., semi-autonomously). In one instance, the data collection module 201 can retrieve the property cost data from corresponding information or data stored in accessible via the geographic database 109 (e.g., historical cost data, average or mean cost data, real-time or substantially real-time cost data, etc.).

By way of example, the property cost data may be based on one or more known valuation methods for determining a relative value of the one or more map features. For example, the property cost data may be based on a purchase price, a construction cost, a current or projected value (e.g., an insurance appraisal value), an average or actual repair cost, an average or actual replacement cost, etc. In one instance, the average or actual repair cost may be based on one or more contextual factors (e.g., weather, temperature, season, etc.). For example, property repair costs may be relatively higher during the winter and/or where there is snow or ice on the ground. In one instance, the property cost data stored in or accessible via the geographic database 109 may be associated with one or more map features by metadata (e.g., a property ID), location-based data (e.g., longitude/latitude), or a combination thereof, which the data collection module 201 can utilize to retrieve the corresponding property cost data (e.g., from the geographic database 109). Retrieving the property cost data for each of the one or more map features is important because such information or data can enable the data processing module 203 to relatively accurately predict whether a vehicle accident involving the one or more map features is likely to result in a relatively high-cost damage or a relatively low-cost damage.

In step 303, the data processing module 203 can determine at least one damage area zone in the geographic area (e.g., corresponding to the digital map 113) based on the property cost data, wherein the at least one damage area zone indicates a zone within the geographic area associated with a property damage value predicted to result from an accident (e.g., a vehicle 101 accident) occurring in the zone based on the property cost data. In one instance, the data processing module 203 can determine the at least one damage area zone based on the property cost data of one or more map features (e.g., properties 119). In one instance, a zone may comprise only one map feature (e.g., a property 119) or a zone may comprise one or more proprieties 119 that have or share a certain property cost above a given threshold.

In one embodiment, the data processing module 203 can determine the at least one damage area zone based on the predicted damage value derived from the property cost data. As described with respect to step 301, the property cost data may be based on one or more known valuation methods for determining a relative value of the one or more map features. In one embodiment, the data processing module 203 can determine the building material data associated with the one or more map features (e.g., properties 119) from a geographic database (e.g., the geographic database 109), wherein the property damage value is further based on the building material data. In one instance, the building material data may comprise information or data associated with building materials such as concrete, wood, steel, glass, etc. In one instance, the data processing module 203 can use the building material data to determine the cost of repairing or replacing the one or more properties 119, one or more vehicles 101, or a combination thereof involved in an accident. For example, if the building is constructed of concrete or steel, the data processing module 203 can predict that the property damage value and/or the cost of the repair may not be as high as if the building is constructed of wood or glass. Similarly, if the building is constructed of concreted or steel, the data processing module 203 can predict that the property damage value and/or repair costs for the one or more vehicles 101 may be higher than if the building is constructed of wood or glass.

In one embodiment, the data processing module 203 can determine the at least one damage area zone and/or a predicted property damage value based on one or more vehicles (e.g., vehicles 101), one or more people (e.g., pedestrians, people 121, etc.), or a combination thereof in the geographic area in addition to or alternatively to the property cost data. In other words, the one or more map features can also comprise the one or more vehicles 101, the one or more people 121, or a combination thereof. By way of example, the data processing module 203 can predict the property damage value and/or the cost of repair of an automobile dealership (e.g., a property 119) based on both the damage to one or more vehicles 101 in the parking lot and the damage to the showroom or salesfloor (e.g., the property 119). In another example, the data processing module 203 can predict the property damage value and/or cost of repair of a restaurant or a school (e.g., a property 119), for example, based on both the damage to the property 119 (e.g., the restaurant or school) as well as the damage to one or more people 121 that may be inside of the restaurant or the school at the time of the accident.

In one instance, the data processing module 203 can detect, by using one or more sensors, one or more vehicles 101 in the geographic area. In one instance, the data processing module 203 can detect one or more vehicles 101 traveling or parked on a road or a link 111 of the geographic area by processing probe or sensor data collected or received from vehicle sensors 107 (GPS sensors), device sensors 117 (e.g., GPS sensors of a UE 115 associated with a driver or passenger of the vehicle 101), or a combination thereof.

In one embodiment, the one or more sensors (e.g., the vehicle sensors 107, the device sensor 117, or a combination thereof) can include an imaging sensor such as a camera sensor (e.g., a front facing camera, a backwards facing camera, etc.), a LiDAR sensor, a RADAR sensor, etc., wherein the one or more vehicles (e.g., vehicles 101) are detected using object recognition from image data captured by the imaging sensor (e.g., a camera sensor, a LiDAR sensor, etc.). The inclusion of imaging sensors with respect to the one or more sensors (e.g., device sensors 117) is important for the data processing module 203 to be able to detect one or more vehicles 101 in the geographic area that may be involved in an accident but are not transmitting probe or sensor data (e.g., the vehicles 101 are not moving or are damaged). In one instance, the data processing module 203 can detect the one or more vehicles based on one or more identifying features of a vehicle 101 such as, but not limited to, a license plate or any other unique feature (e.g., a logo, a sticker, a marking, etc.). In one instance, the data processing module 203 can detect the one or more vehicles 101 based on a line-of-sight detection as seen from the field of the view of a camera sensor (e.g., a camera sensor 107), a non-line-of-sight means (e.g., via a vehicle-to-vehicle (V2V) communication, or a combination thereof.

In one embodiment, the data collection module 201 can determine vehicle cost data for the one or more vehicles 101, wherein the property damage value determined by the data processing module 203 further includes a vehicle damage value predicted to result from the accident occurring in the zone based on the vehicle cost data. In one instance, the data collection module 201 can determine the vehicle costs data for the one or more vehicles 101 based on information or data stored in or accessible via the geographic database 109. In one instance, the vehicle cost data may be based on one or more known valuation methods for determining a relative value of the one or more vehicles 101. For example, the vehicle cost data may be based on a purchase price, a current or projected value (e.g., an insurance appraisal), an average or actual repair cost, an average or actual replacement cost, or a combination thereof.

In one instance, the data collection module 201 can determine the vehicle cost data based on respective metadata (e.g., a vehicle ID), location-based data (e.g., a probe ID), or a combination thereof associated with the one or more vehicles 101. In one instance, the data processing module 203 can process the image data of one or more vehicles 101 on a road or a link 111 to determine vehicle strength data, vehicle durability data, or a combination thereof associated with the one or more vehicles 101, wherein the vehicle damage value is predicted further based on the vehicle strength data, the vehicle durability data, or a combination thereof. In one instance, the data processing module 203 can determine the vehicle strength data, the vehicle durability data, or a combination thereof based on corresponding information or data (e.g., based on a vehicle or probe ID) and stored in or accessible via the geographic database 109.

By way of example, if the data processing module 203 determines (e.g., based on image data, information or data stored in or accessible via the geographic database 109, or a combination thereof) that a vehicle 101 parked on a road or a link 111 has a strength or durability value above a certain threshold (e.g., a tractor trailer), then the data processing module 203 can determine that the vehicle damage value will likely be below a certain threshold in the event of an accident. In contrast, if the data processing module 203 determines that the vehicle 101 has a strength or durability value below a certain threshold (e.g., a hatchback), then the data processing module 203 can determine that the vehicle 101 damage value will likely be above a certain threshold in the event of an accident. In one instance, the data processing module 203 can determine that the property damage values relative to the two vehicles will be the opposite, respectively. For example, a tractor trailer is likely to cause extensive damage to one or more properties 119, whereas a hatchback is likely to cause less damage to one or more properties 119.

In one embodiment, the data processing module 203 can detect, by using one or more sensors, one or more people in the geographic area. By way of example, the one or more people (e.g., people 121) may be pedestrians walking on or along a road or a link 111, one or more people 121 seated or standing inside or outside of one more map features (e.g., a house, a restaurant, a shop, a bar, etc.), or a combination thereof. In one embodiment, the data processing module 203 can detect the one or more people in the geographic area (e.g., corresponding to the digital map 113) based on probe or sensor data transmitted or collected from one or more device sensors 117 (e.g., GPS sensors), one or more vehicle sensors 107 (e.g., RADAR sensors, LiDAR sensors, thermal sensors, etc.), or a combination thereof associated with one or more people 121.

In one instance, the data collection module 201 can determine people property cost value associated with the one or more people (e.g., people 121), wherein the property damage value further includes a people property damage value predicted (e.g., by the analysis module 205) to result from an accident occurring in the zone based on the vehicle cost data. By way of example, the people property cost value may be based on information or data stored in or accessible via the geographic database 109 associated with one or more objects or property in a person 121's possession or control at the time of the accident. For example, the data processing module 203 can determine that a person 121 has one or more objects with connectivity to the communication network 105 such as a UE 115 (e.g., a mobile device, a smartphone, etc.), a vehicle 101 (e.g., a shared bike, shared scooter, etc.), or a combination thereof.

In one embodiment, the analysis module 205 can assign a people cost for the one or more people 121, wherein the property damage value further includes a people damage value that is predicted (e.g., by the analysis module 205) to result from the accident occurring in the zone based on the people damage value. By way of example, the analysis module 205 can assign the people cost for the one or more people 121 based on information or data stored in accessible via the geographic database 109 (e.g., actuarial tables). In one instance, the analysis module 205 can assign the people cost for the one or more people 121 based on one or more probabilities or one or more ancillary factors (e.g., individual behavior, a propensity for negligence, etc.).

By way of example, the analysis module 205 can determine that the predicted property damage value for a person 121 not wearing a helmet, for example, is greater than the predicted property damage value for a person 121 wearing a helmet. In other words, the person 121 wearing the helmet is more likely to survive an accident. In another example, the analysis module 205 can determine that the predicted property damage value for a world renown expert, for example, is greater than a person 121 without fame or expertise. In other words, the damage to the world renown expert 121 would likely be more costly. In yet another example, the analysis module 205 can determine that the predicted property damage value for a young child, for example, is greater that the predicted property damage value for a person 121 near the end of her life if the analysis module 205 is basing the value on potential earnings. In contrast, if the analysis module 205 based the value on survivability, then the analysis module 205 may determine that the predicted property damage value for a young person 121 (e.g., a baby) is less than the person 121 near the end of her life.

In one embodiment, the analysis module 205 can classify the at least one damage zone as a maximum damage zone based on determining that the predicted property damage value is above a maximum value threshold or as a minimum damage zone based on determining that the predicted property damage value is below a minimum value threshold. In one instance, the data collection module 201 can determine the maximum value threshold and/or the minimum value threshold based on information or data stored in or accessible via the geographic database 109. By way of example, the information or data may include and/or be based on one or more contextual factors or parameters (e.g., a historical average, mean, or median property cost for the geographic area of interest). Classifying the at least one damage zone is important to determine where to minimize potential vehicle 101 accidents (e.g., the maximum damage zones) in a geographic area (if possible).

In step 305, the output module 207 can provide the at least one damage zone as a digital channel output of a geographic database. By way of example, the digital channel can comprise a navigation or mapping application 123 of a UE 115 (e.g., a mobile device, a smartphone, etc.) connected to the communication network 105. In one instance, the digital channel output further includes the maximum damage zone or the minimum damage zone. In one embodiment, the routing module 209 can generate a navigation route (e.g., for an autonomous vehicle 101) based on the digital channel output that is generated based on a cost function (e.g., determined by the analysis module 205) that minimizes the property damage value encountered along the navigation route.

In one embodiment, the training module 211 in connection with the machine learning system 125 can determine the property damage predicted value based on the property cost data, vehicle cost data, people property cost data, people cost data, or a combination thereof (e.g., stored in or accessible via the geographic database 109). In one embodiment, the training module 211 can train the machine learning system 125 to select or assign respective weights, correlations, relationships, etc. among the factors to predict the property damage value because of an accident occurring in the zone of the geographic area. By way of example, the training module 211 can train the machine learning system 125 to select or assign respective weights to the vehicle purchase price and/or current value relative to the vehicle strength and/or durability to determine the vehicle cost in terms of potential damage cost in an accident. In another example, the training module 211 can train the machine learning system 125 to select or assign respective weights to the property purchase price and/or current value relative to the building or construction materials to determine the property cost in terms of potential damage cost in an accident.

In one embodiment, the training module 211 can continuously provide and/or update a machine learning model (e.g., a support vector machine (SVM), neural network, decision tree, etc.) of the machine learning system 125 during training using, for instance, supervised deep convolution networks of equivalents. In other words, the training module 211 can train a machine learning model using the respective weights of the cost and/or ancillary information or data to most efficiently predict the property damage values and/or damage area zones to minimize the damages resulting from vehicle 101 accidents in the geographic area.

In one instance, the machine learning system 125 can improve the machine learning models using feedback loops based on, for example, the comparison of predicted property damage value and actual property damage value based on one or more subsequent accidents (e.g., collected from repair shop information, insurance claim information, etc. stored in or accessible via the geographic database 109). In one embodiment, the machine learning system 125 can improve the machine learning modules using the actual property damage costs (e.g., ground truth data) as training data. For example, the machine learning system 125 can analyze predicted property damage values that fall within a certain threshold or tolerance of the actual property damage costs to determine the performance of the machine learning models.

In one embodiment, the training data can include ground truth data taken from historical damage costs (e.g., provided by a repair shop, an insurance company, etc.). For instance, in a data mining process, features are mapped by the training module 211 to ground truth damage costs to form a training instance. A plurality of training instances can form the training data for the machine learning system 125 using one or more machine learning algorithms (e.g., random forest, decision trees, etc.). For instance, the training data can be split into a training set and a test set (e.g., at a ratio of 7:3). After evaluating several machine learning models based on the training set and the test set, the machine learning model that produces the highest classification accuracy in training and testing can be used by the machine learning system 125 as the property damage value prediction machine learning model.

Figure 4A:
FIGS. 4A through 4C are diagrams of example user interfaces for predicting damage area zones for a vehicle to avoid in case of an accident, according to example embodiment(s)
Figure 4B:
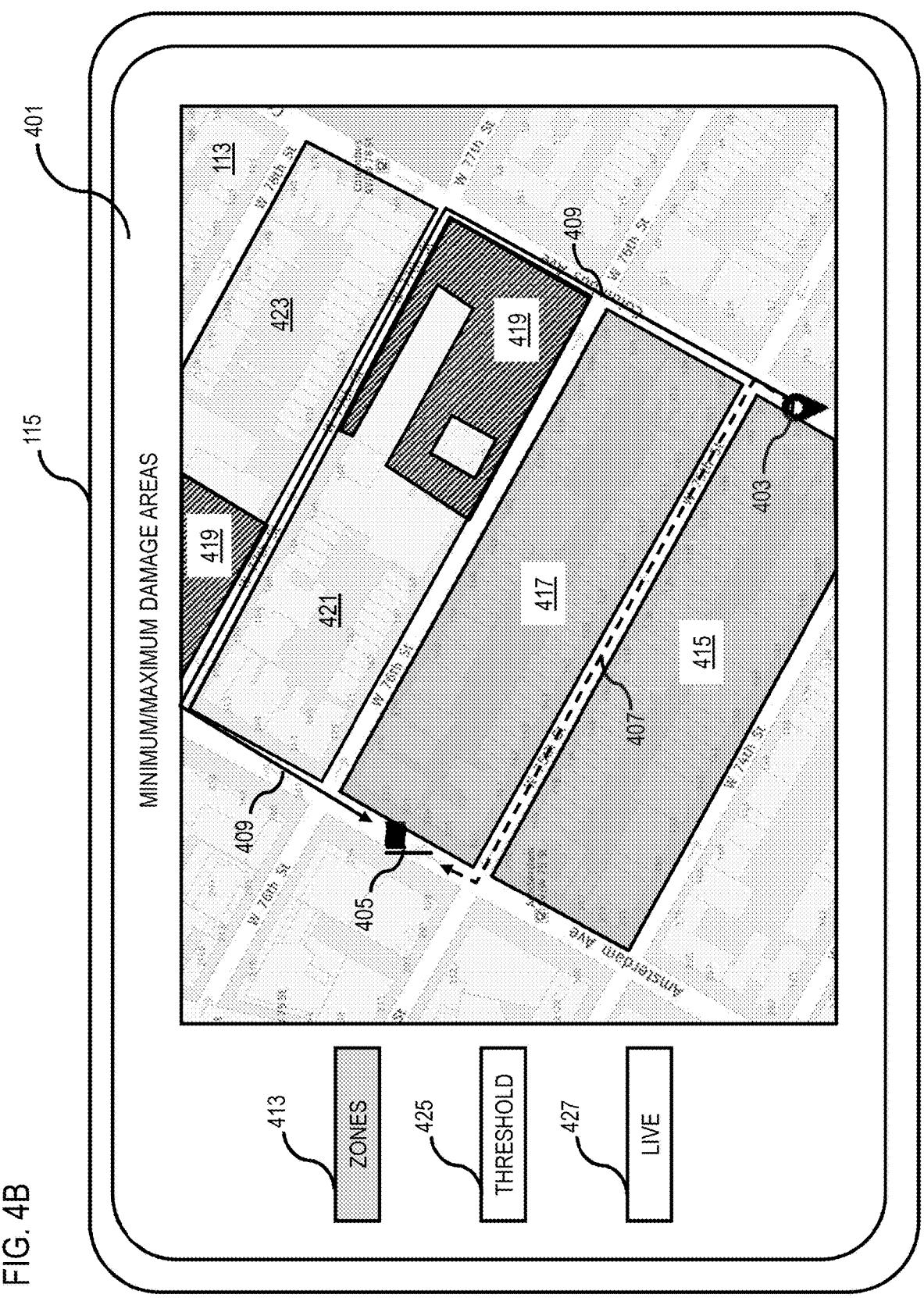
Figure 4C:
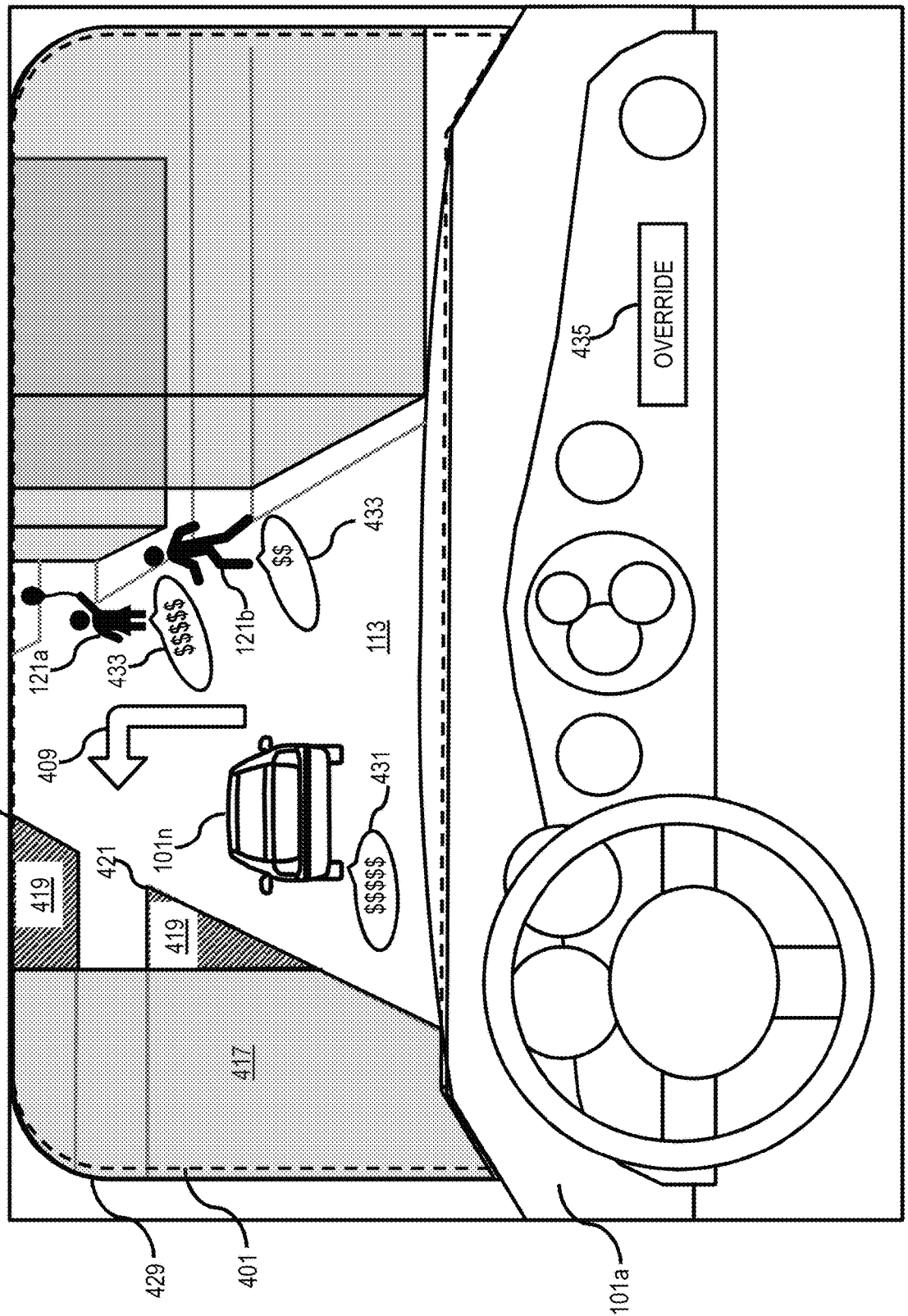

FIGS. 4A through 4C are diagrams of example user interfaces for predicting damage area zones for a vehicle to avoid in case of an accident, according to example embodiment(s). In one embodiment, the system 100 can generate a user interface (UI) 401 for a vehicle 101 (e.g., an autonomous vehicle), a UE 115 (e.g., a mobile device, a smartphone, etc.), or a combination thereof (e.g., an embedded navigation system) that can enable a user (e.g., a driver or a passenger of a vehicle 101, a vehicle 101 fleet manager, etc.) to minimize potential damage costs in the event of an accident involving a vehicle 101. In one instance, the UI 401 may be part of or associated with a routing or a navigation application 123 and can include one or more minimum/maximum damage areas displayed directly on the digital map 113.

Referring to FIG. 4A ("Route Comparison"), in one example use case, a user (e.g., a fleet manager) has received a request for a vehicle 101 (e.g., an autonomous vehicle) to transport a customer 121 from an origin 403 to a destination 405 and wants to know the route with the least risk in terms of potential damage costs in the event of an accident (e.g., caused by user negligence, unforeseen circumstance, etc.). In this example, the system 100 has generated two possible routes based on the customer request (e.g., routes 407 and 409). In this instance, route 407 appears to be much shorter in distance than route 409, and, therefore, possibly shorter in terms of the time required for the vehicle 101 to reach the destination 405; however, it is not yet known whether route 407 is also less risky than route 409 in terms of potential damage costs (the stated goal).

In one embodiment, the system 100 can generate the UI 401 such that it includes one or more inputs 411 that can enable a user to compare one or more possible routes based on one or more common parameters (e.g., cost, time, distance, etc.). In this instance, the inputs 411 specifically correspond to "cost," "time," "distance," and "damage." By way of example, the term "damage" as used herein refers to the predicted damage costs likely to result from an accident involving the moving vehicle 101, property 119, one or more other vehicles 101 (e.g., traveling, driving, parked, etc.), and/or people 121 (e.g., pedestrians, people seated/standing, etc.) in the given area (e.g., the digital map 113).

In this example, the user has selected and/or requested through one or more interactions with the input 411 (e.g., "Damage") that the system 100 compare the predicted damage costs relative to routes 407 and 409. For example, in a metropolitan area, a city center, etc. (e.g., New York City), there may be a relatively high density of expensive properties 119, luxury vehicles 101, high net worth people 121, etc. and, therefore, the user may want to find the route with the least risk that is relatively like the other route(s) in terms of cost, time, distance, etc. In the case of a user such as a driver or a passenger of an autonomous or semi-autonomous vehicle 101 or a driver of a standard vehicle 101 in an unfamiliar area, the user may want (e.g., for peace of mind) to have some visual confirmation or reference that the suggested guidance will take her vehicle 101 on the route that minimizes the potential damage costs.

In one instance, if the system 100 determines that the potential damage costs for a given area or route exceed a given threshold (e.g., a route in a city center, dense urban environment, etc.), the system 100 can generate the UI 401 such that the route with the least potential damage costs is presented as the guidance route by "default." Similarly, in one instance, the system 100 can generate the UI 401 such that it automatically presents the minimum/maximum damage areas on the digital map 113 by default. In this example, the user has selected input 411 (e.g., "Damage" via a touch) to cause the system 100 to compare the presented guidance routes (e.g., routes 407 and 409) in terms of potential damage costs, as depicted in FIG. 4B.

Referring to FIG. 4B ("Minimum/Maximum Damage Areas"), following the user's interaction with the input 411 "Damages" (represented by the shading in FIG. 4A), the system 100 can determine the predicted minimum/maximum damage areas based on the relevant property 119 costs, vehicle 101 costs, people 121 costs (e.g., stored in or accessible via the geographic database 109). In one embodiment, the system 100 can generate the UI 401 such that it includes an input 413 (e.g., "Zones") to enable a user to view a graphic representation of the minimum/maximum damage areas. As previously described, the graphic presentation of the minimum/maximum damage areas via the UI 401 may help a user (e.g., passenger) feel more comfortable using an autonomous vehicle 101 if they understand why the vehicle 101 is navigating along a particular route. Similarly, the graphic presentation via the UI 401 may help a fleet manager or software engineer to confirm that the autonomous vehicle 401 and/or route generation is working properly.

In one embodiment, the one or more inputs 411 and all the other inputs similarly described herein with respect to FIGS. 4A-4C can be generated by the system 100 such that a user can interact with the input and/or the system 100 can receive information or data from the user (e.g., a user selection) through one or more physical interactions (e.g., a touch, a tap, a gesture, typing, etc.), one or more voice commands (e.g., "compare damage"), or a combination thereof. In one instance, the system 100 can generate the UI 401 such that it can provide a user with one or more audio cues of notifications. For example, the UI 401 may present an audible notification or alert as the vehicle 101 approaches a relatively high damage area to prompt the user (e.g., driver/passenger) to be on high alert and/or to manually search for an alternative route. For example, in a live scenario or real-time scenario, the system 100 can detect that multiple luxury vehicles 101 or people 121 have suddenly entered an area along the guidance route of a vehicle 101 (e.g., an autonomous vehicle) and, therefore, the initial minimum/maximum damage areas may have changed, require user input, etc.

In this example, the system 100 can determine based on the various applicable costs that while the route 409 is much longer, the predicted damage costs along the route are sufficiently lower compared to the route 407 and, therefore, the vehicle should use the route 409 to reach the destination 405. For example, the system 100 can determine based on the relevant property cost data (e.g., stored in or accessible via the geographic database 109) that the properties 119 adjacent to or near the potential route 407 include some of the most expensive properties 119 in the area and, therefore, correspond to maximum damage areas 415 and 417. In contrast, the system 100 can determine based on the relevant property cost data (e.g., stored in or accessible via the geographic database 109) that the properties 119 adjacent to or near the potential route 409 include large sections of public space 419 without any structures 119 or vehicles 101 and, therefore, correspond to minimum damage areas 421 and 423. As such, in case of an accident involving the vehicle 101 (e.g., due to user error, mechanical failure, etc.) the damage costs likely from an accident involving the vehicle 101 and the maximum damage areas 415 and 417 is predicted to be much higher than the damage costs likely from an accident involving the vehicle 101 and the minimum damage areas 421 and 423.

In one embodiment, the system 100 can generate the UI 401 such that it includes an input 425 (e.g., "Threshold") to enable a user (e.g., a software programmer) to adjust one or more threshold values used by the system 100 to determine the maximum damage areas and the minimum damage areas. For example, changing one or more threshold value could affect whether a cost of a property 119, a vehicle 101, a person 121 falls within the maximum damage area, it could affect the number of properties 119, number of vehicles 101, number of persons 121 required to form an area or zone of a sufficient size or proportion to affect the route between the origin 403 and the destination 405.

In one embodiment, the system 100 can generate the UI 401 such that it includes an input 427 (e.g., "Live") to enable the user (e.g., a passenger or a fleet manager) to use the UI 401 in live scenarios such that the system 100 has access to vehicle 101 and people 121 data (e.g., probe data) in real time or substantially real time, particularly where such data may change previously determined minimum/maximum damage areas. For example, the system 100 can determine that the determination of the minimum damage areas 421 and 423 would substantially increase in the case of hundreds of people 121 occupying the public spaces 419 in connection with a protest, a festival, political rally, etc. and, therefore, the rational underlying taking route 409 instead of route 407 may no longer apply. By way of example, the user may want to user the "Live Scenario" function when the UE 115 has a relatively strong connection to the communication network 105 and/or a relatively strong battery or power source. In contrast, the user may want to use the system 100 in an "offline" mode or scenario when the connection is relatively weak and/or the UE 115 battery or power is relatively low.

Referring to FIG. 4C, in one embodiment, the system 100 can generate the UI 401 as a 3D/AR view on a heads-up display or windshield 429 of a vehicle 101 (e.g., the autonomous vehicle 101a) so that a user (e.g., a passenger) can view the recommended route 409, the maximum damage area 417, the minimal damage areas 421 and 423 of the digital map 113 to potentially help the user have confidence in the recommended route 409, thereby making the user feel more comfortable while riding in the autonomous vehicles 101a. In one embodiment, the system 100 can generate the UI 401 such that the vehicle 101 cost data 431 (e.g., "$$$$$") and the people 121 cost data 433 (e.g., "$$" and "$$$$$") can be represented to the user in a live scenario or real time. In this instance, the system 100 can determine, for example, that the vehicle 101n has relatively high damage cost (e.g., "$$$$$") and, therefore should be avoided (e.g., by changing lanes or slowing down before making the upcoming left turn). Likewise, the system 100 can determine that the person 121a (e.g., a baby) has a relatively high damage cost (e.g., "$$$$$") relative to the damage cost 433 (e.g., "$$") associated with the person 121n (e.g., a pedestrian) and, therefore between the two, the person 121a should be avoided (e.g., by changing lanes or slowing down when approaching the person 121a). In one embodiment, the system 100 can generate the UI 401 such that it includes an input 435 ("Override") to enable the user (e.g., a passenger) to take control of the autonomous vehicle 101a and/or deviate from the guided route (e.g., route 409), for example, where the user becomes uncomfortable and/or there is a change in context (e.g., the pedestrian 121b darting into the street and/or picking up the person 121a).

Returning to FIG. 1, in one embodiment, the mapping platform 103 has connectivity over the communication network 105 to the services platform 127 (e.g., an OEM platform) that provides one or more services 129a-129n (also collectively referred to as services 129) (e.g., probe and/or sensor data collection services). By way of example, the services 129 may also be other third-party services and include mapping services, navigation services, vehicle cost, property cost, people cost services (e.g., actuarial services), traffic incident services, travel planning services, notification services, social networking services, content (e.g., audio, video, images, etc.) provisioning services, application services, storage services, contextual information determination services, location-based services, information-based services (e.g., weather, news, etc.), etc. In one embodiment, the services platform 127 uses the output (e.g., a digital channel output for routing and guidance of autonomous vehicles 101, a digital map including the maximum and/or maximum damage zones, or a combination thereof) of the mapping platform 103 to provide services such as navigation, mapping, other location-based services, etc.

In one embodiment, the mapping platform 103 may be a platform with multiple interconnected components. In one instance, the mapping platform 103 may include multiple servers, intelligent networking devices, computing devices, components, and corresponding software for providing parametric representations of lane lines. In addition, it is noted that the mapping platform 103 may be a separate entity of the system 100, a part of the services platform 127, a part of the one or more services 129, or included within the vehicles 101 (e.g., an embedded navigation system).

In one embodiment, content providers 131a-131n (also collectively referred to as content providers 131) may provide content or data (e.g., property cost data, vehicle cost data, people cost data, probe data, sensor data, imaging data, etc.) to the vehicles 101, the mapping platform 103, the geographic database 109, the UEs 115, the applications 123, the services platform 127, and the services 129. The content provided may be any type of content, such as map content, textual content, audio content, video content, image content, etc. In one embodiment, the content providers 131 may provide content that may aid in localizing a vehicle 101 path or trajectory on a lane of a digital map (e.g., the digital map 113) or link (e.g., the link 111). In one embodiment, the content providers 131 may also store content associated with the vehicles 101, the mapping platform 103, the geographic database 109, the UEs 115, the services platform 127, and/or the services 129. In another embodiment, the content providers 131 may manage access to a central repository of data, and offer a consistent, standard interface to data, such as a repository of the geographic database 109.

By way of example, the UEs 115 can be are any type of mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that a UE 115 can support any type of interface to the user (such as "wearable" circuitry, etc.). In one embodiment, a UE 115 may be associated with a vehicle 101 (e.g., a mobile device) or be a component part of the vehicle 101 (e.g., an embedded navigation system). In one embodiment, the UEs 115 may include the mapping platform 103 to predict damage area zones for a vehicle to avoid in case of an accident.

In one embodiment, as mentioned above, the vehicles 101 can be part of a probe-based system for collecting probe data and/or sensor data for detecting properties 119, vehicles 101, and/or people 121 on or near a road or a link 111 in an area (e.g., corresponding to the digital map 113). In one embodiment, each vehicle 101 is configured to report probe data as probe points, which are individual data records collected at a point in time that records telemetry data for that point in time. In one embodiment, the probe ID can be permanent or valid for a certain period of time. In one embodiment, the probe ID is cycled, particularly for consumer-sourced data, to protect the privacy of the source.

In one embodiment, a probe point can include attributes such as: (1) probe ID, (2) longitude, (3) latitude, (4) heading, (5) speed, and (6) time. The list of attributes is provided by way of illustration and not limitation. Accordingly, it is contemplated that any combination of these attributes or other attributes may be recorded as a probe point. For example, attributes such as altitude (e.g., for flight capable vehicles or for tracking non-flight vehicles in the altitude domain), tilt, steering angle, wiper activation, etc. can be included and reported for a probe point. In one embodiment, the vehicles 101 may include vehicle sensors 107 for reporting measuring and/or reporting attributes. The attributes can also be any attribute normally collected by an on-board diagnostic (OBD) system of the vehicle 101, and available through an interface to the OBD system (e.g., OBD II interface or other similar interface).

The probe points can be reported from the vehicles 101 (e.g., driving on a road or a link 111, parked or stopped on a road or a link 111 and/or near the properties 119, etc.) in real-time, in batches, continuously, or at any other frequency requested by the system 100 over, for instance, the communication network 105 for processing by the mapping platform 103. The probe points also can be map matched to specific road links (e.g., a road or a link 111) stored in the geographic database 109. In one embodiment, the system 100 (e.g., via the mapping platform 103) can generate probe traces (e.g., vehicle paths or trajectories) from the probe points for an individual probe so that the probe traces represent a travel trajectory or vehicle 101 path of the probe through the road network (e.g., a road or a link 111 of the digital map 113).

In one embodiment, as previously stated, the vehicles 101 are configured with various sensors (e.g., vehicle sensors 107) for generating or collecting probe data, sensor data, image-based data, related geographic/map data, etc. In one embodiment, the sensed data represents sensor data (e.g., metadata) associated with a geographic location or coordinates (e.g., longitude/latitude) at which the sensor data (e.g., image data) was collected. In one embodiment, the probe data includes location probes collected by one or more vehicle sensors 107. By way of example, the vehicle sensors 107 may include a RADAR system, a LiDAR system, global positioning sensors for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data, an audio recorder for gathering audio data, velocity sensors mounted on a steering wheel of the vehicles 101, switch sensors for determining whether one or more vehicle switches are engaged, and the like. Though depicted as automobiles, it is contemplated the vehicles 101 can be any type of vehicle manned or unmanned private or shared (e.g., cars, trucks, buses, vans, motorcycles, scooters, drones, etc.) that are located within a given area (e.g., the digital map 113).

Other examples of vehicle sensors 107 may include light sensors, orientation sensors augmented with height sensors and acceleration sensor (e.g., an accelerometer can measure acceleration and can be used to determine orientation of the vehicle), tilt sensors to detect the degree of incline or decline of the vehicles 101 along a path of travel (e.g., a road or a link 111), moisture sensors, pressure sensors, etc. In a further example embodiment, vehicle sensors 107 about the perimeter of the vehicles 101 may detect the relative distance of the vehicles 101 from a physical divider, a lane line of a link or roadway (e.g., a road or a link 111), the presence of other vehicles 101, pedestrians 121, traffic lights, potholes and any other objects, or a combination thereof. In one scenario, the vehicle sensors 107 may detect weather data (e.g., for use in determining property 119 repair costs), traffic information, or a combination thereof. In one embodiment, the vehicles 101 may include GPS or other satellite-based receivers 107 to obtain geographic coordinates from satellites 133 for determining current location and time. Further, the location can be determined by visual odometry, triangulation systems such as A-GPS, Cell of Origin, or other location extrapolation technologies.

In one embodiment, the UEs 115 may also be configured with various device sensors 117 (e.g., GPS sensors) for acquiring and/or generating probe data and/or sensor data associated with a property 119 (e.g., image data), a vehicle 101 (e.g., parked, stopped, or driving on a road or a link 111), a driver or passenger of a vehicle 101, a pedestrian or occupant of a property 119, conditions regarding the driving environment or roadway, etc. For example, such device sensors 117 may be used as GPS receivers for interacting with the one or more satellites 133 to determine and track the current speed, position, and location of a vehicle 101 or a pedestrian 121 travelling along a link or roadway (e.g., a road or a link 111). In addition, the device sensors 117 may gather tilt data (e.g., a degree of incline or decline of a vehicle 101 during travel), motion data, light data, sound data, image data, weather data, temporal data and other data associated with the vehicles 101 and/or the UEs 115. Still further, the device sensors 117 may detect local or transient network and/or wireless signals, such as those transmitted by nearby devices during navigation of a vehicle along a roadway (Li-Fi, near field communication (NFC)) etc.

It is noted therefore that the above-described data may be transmitted via communication network 105 as probe data (e.g., GPS probe data) according to any known wireless communication protocols. For example, each vehicle 101, UE 115, application 123, and/or user may be assigned a unique probe identifier (probe ID) for use in reporting or transmitting said probe data collected by the vehicles 101 and/or UEs 115. In one embodiment, each vehicle 101 and/or UE 115 is configured to report probe data as probe points, which are individual data records collected at a point in time that records telemetry data.

In one embodiment, the mapping platform 103 retrieves aggregated probe points gathered and/or generated by the vehicle sensors 107 and/or the device sensors 117 resulting from the travel of the vehicles 101 and/or UEs 115 (e.g., a mobile device) on a road segment of a road network (e.g., a road or a link 111 of the digital map 113). In one instance, the geographic database 109 stores a plurality of probe points and/or trajectories generated by different vehicles 101, vehicle sensors 107, UEs 115, device sensors 117, applications 123, etc. over a period while driving or located in a monitored area (e.g., the digital map 113). A time sequence of probe points specifies a trajectory—i.e., a path traversed by a vehicle 101, a UE 115, an application 123, etc. over the period.

In one embodiment, the communication network 105 of the system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UNITS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the vehicles 101, vehicle sensors 107, mapping platform 103, UEs 115, device sensors 117, applications 123, services platform 127, services 129, content providers 131, and/or satellites 133 communicate with each other and other components of the system 100 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

In one embodiment, the machine learning system 125 of the mapping platform 103 can include a neural network or other machine learning system to determine the property damage predicted value based on the determined property cost data, vehicle cost data, people property cost data, people cost data, or a combination thereof (e.g., stored in or accessible via the geographic database 109). In one embodiment, the machine learning system 125 is trained (e.g., by the training module 211 of the mapping platform 103) to select or assign respective weights, correlations, relationships, etc. among the factors to predict the property damage value due to an accident occurring within the zone. In one embodiment, the machine learning system 125 can select and/or update the respective weights or weighting schemes related to the learned property damage costs, vehicle damage costs, people damage costs resulting from a subsequent vehicle 101 accident. For example, the machine learning system 125 can select or assign respective weights to the vehicle 101 purchase price and/or current value relative to the vehicle strength and/or durability to determine the vehicle cost in terms of potential damage from a vehicle 101 accident. In another example, the machine learning system 123 can select or assign respective weights to the property 119 purchase price and/or current value relative to the building or construction materials to determine the property cost in terms of potential damage from a vehicle 101 accident.

In one embodiment, the machine learning system 125 can iteratively improve the speed and accuracy by which the system 100 can predict minimal/maximum damage areas and/or determine the routes with the least damage cost risk to navigate. In one instance, the machine learning system 125 can improve the machine learning models using feedback loops based on, for example, the comparison of predicted property damage value and actual property damage value based on a subsequent accident (e.g., based on collected from repair shop information, insurance claim information, etc. stored in or accessible via the geographic database 109). In one embodiment, the machine learning system 125 can improve the machine learning modules using the actual property damage costs as training data. For example, the machine learning system 125 can analyze predicted property damage values within a certain threshold or tolerance of the actual property damage costs to determine the performance of the machine learning models.

In one embodiment, the neural network of the machine learning system 125 is a traditional convolutional neural network which consists of multiple layers of collections of one or more neurons (which are configured to process a portion of an input data). In one embodiment, the machine learning system 125 also has connectivity or access over the communication network 105 to the geographic database 109 that can store labeled or marked features (e.g., property 119 costs, vehicle 101 costs, people 121 costs, etc.) of a road or a link 111 of the area (e.g., the digital map 113), population density models, area specific mobility graphs, historical movement patterns, respective weights or weighting schemes, etc.).

Figure 5:
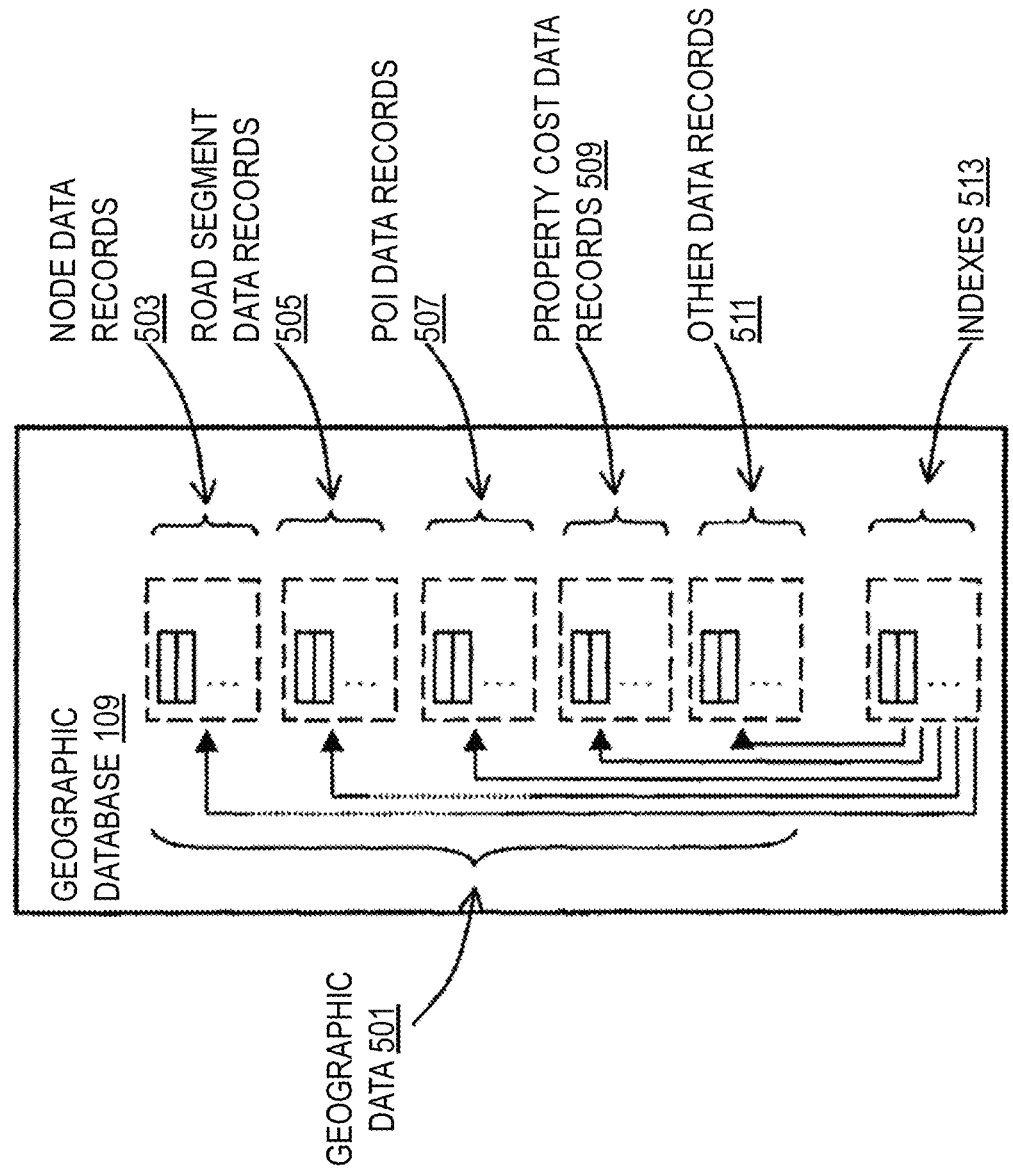
FIG. 5 is a diagram of a geographic database, according to example embodiment(s)

FIG. 5 is a diagram of a geographic database (e.g., the geographic database 109), according to example embodiment(s). In one embodiment, the geographic database 109 includes geographic data 501 used for (or configured to be compiled to be used for) predicting damage area zones for a vehicle to avoid in case of an accident. In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 109.

"Node"—A point that terminates a link.

"Line segment"—A straight line connecting two points.

"Link" (or "edge")—A contiguous, non-branching string of one or more-line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon (e.g., a hexagon) is constructed from one outer simple polygon and none or at least one inner simple polygon. A polygon is simple if it just consists of one simple polygon, or complex if it has at least one inner simple polygon.

In one embodiment, the geographic database 109 follows certain conventions. For example, links (e.g., links 111) do not cross themselves and do not cross each other except at a node. Also, there are no duplicated shape points, nodes, or links. Two links that connect each other have a common node. In the geographic database 109, overlapping geographic features are represented by overlapping polygons. When polygons overlap, the boundary of one polygon crosses the boundary of the other polygon. In the geographic database 109, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 109 includes node data records 503, road segment or link data records 505, POI data records 507, property cost data records 509, other records 511, and indexes 513, for example. More, fewer, or different data records can be provided. In one embodiment, additional data records (not shown) can include cartographic ("carto") data records, routing data, and maneuver data. In one embodiment, the indexes 513 may improve the speed of data retrieval operations in the geographic database 109. In one embodiment, the indexes 513 may be used to quickly locate data without having to search every row in the geographic database 109 every time it is accessed. For example, in one embodiment, the indexes 513 can be a spatial index of the polygon points associated with stored feature polygons.

In exemplary embodiments, the road segment data records 505 are links or segments representing roads (e.g., roads or links 111), streets, or paths (e.g., that are unique to an area) that can be used for predicting damage area zones for property 119, vehicles 101, people 121, or a combination thereof located on or near the roads or the links 111 of an area (e.g., as represented by the digital map 113). The node data records 503 are end points corresponding to the respective links or segments of the road segment data records 505. The road link data records 505 and the node data records 503 represent a road network, such as used by vehicles 101 and/or other entities. Alternatively, the geographic database 109 can contain path segment and node data records or other data that represent pedestrian paths or areas in addition to or instead of the vehicle road record data, for example.

The road/link segments and nodes can be associated with attributes, such as geographic coordinates, street names, address ranges, average property 119 costs, speed limits, turn restrictions at intersections, and other navigation related attributes, as well as POIs, such as a restaurant, a retail shop, an office, etc. The geographic database 109 can include data about the POIs and their respective locations in the POI data records 507. In one embodiment, the POI data records 507 can include population density data (e.g., foot traffic), hours of operation, popularity or preference data, prices, ratings, reviews, and various other attributes. The geographic database 109 can also include data about places, such as cities, towns, or other communities, and other geographic features, such as bodies of water, mountain ranges, etc. Such place or feature data can be part of the POI data records 507 or can be associated with POIs or POI data records 507 (such as a data point used for displaying or representing a portion of a city).

In one embodiment, the geographic database 109 includes property cost data records 509 including property cost information as well as building material information for the properties 119 in a given area (e.g., properties 119 located on a road or a link 111); vehicle cost information as well as vehicle strength and vehicle durability information for the vehicles 101 in a given area (e.g., driving, stopped, or parked on a road or a link 111); people cost information (e.g., based on actuarial tables) as well as individual property cost information (e.g., mobile devices, shared scooters, etc.) for the people 121 in a given area (e.g., pedestrians, occupants of a property 119 or a vehicle 101, etc.). In one instance, the property cost data records 509 can also include maximum and minimum threshold values (e.g., based on historic averages, means, etc.). In one instance, the property cost data records 509 can include both the predicted costs and the actual costs based on a subsequent accident involving a vehicle 101 that the machine learning system 125 can use for training and testing purposes (e.g., in connection with the training module 211 of the mapping platform 103). In one instance, the property cost data records 509 can include rankings, probabilities, weights or weighting schemes, labeled and/or marked features and attributes, and/or any other related data. In one embodiment, the property cost data records 509 can be associated with one or more of the node data records 503, road segment or link records 505, and/or POI data records 507; or portions thereof (e.g., smaller or different segments than indicated in the road segment records 505) to predict damage area zones for a vehicle to avoid in case of an accident.

In one embodiment, the geographic database 109 can be maintained by the services platform 127 (e.g., a map developer). The map developer can collect human movement data to generate and enhance the geographic database 109. There can be different ways used by the map developer to collect data. These ways can include obtaining data from other sources, such as municipalities or respective authorities (e.g., city real estate records, vehicle registration records, etc.). In addition, the map developer can employ field personnel to travel by a vehicle 101 (e.g., an autonomous or semi-autonomous vehicle) along a road or a link 111 throughout an area of interest (e.g., the digital map 113) to observe and/or record information regarding the properties 119, vehicles 101, and/or people 121 in the area. Similarly, the map developer can employ field personnel to travel by foot throughout an area of interest (e.g., the digital map 113) to observe and/or record information regarding the properties 119, vehicles 101, and/or people 121 in the area. Also, remote sensing, such as aerial or satellite photography (e.g., from the satellites 133), can be used.

In one embodiment, the geographic database 109 include high resolution or high definition (HD) mapping data that provide centimeter-level or better accuracy of map features. For example, the geographic database 109 can be based on LiDAR or equivalent technology to collect billions of 3D points and model road surfaces and other map features down to the number lanes and their widths. In one embodiment, the HD mapping data capture and store details such as the slope and curvature of the road, lane markings, roadside objects such as signposts, including what the signage denotes. By way of example, the HD mapping data enable highly automated vehicles 101 to precisely localize themselves on a road, and to determine the road attributes (e.g., direction of traffic) at high accuracy levels.

In one embodiment, the geographic database 109 is stored as a hierarchical or multi-level tile-based projection or structure. More specifically, in one embodiment, the geographic database 109 may be defined according to a normalized Mercator projection. Other projections may be used. By way of example, the map tile grid of a Mercator or similar projection is a multilevel grid. Each cell or tile in a level of the map tile grid is divisible into the same number of tiles of that same level of grid. In other words, the initial level of the map tile grid (e.g., a level at the lowest zoom level) is divisible into four cells or rectangles. Each of those cells are in turn divisible into four cells, and so on until the highest zoom or resolution level of the projection is reached.

In one embodiment, the map tile grid may be numbered in a systematic fashion to define a tile identifier (tile ID). For example, the top left tile may be numbered 00, the top right tile may be numbered 01, the bottom left tile may be numbered 10, and the bottom right tile may be numbered 11. In one embodiment, each cell is divided into four rectangles and numbered by concatenating the parent tile ID and the new tile position. A variety of numbering schemes also is possible. Any number of levels with increasingly smaller geographic areas may represent the map tile grid. Any level (n) of the map tile grid has 2(n+1) cells. Accordingly, any tile of the level (n) has a geographic area of A/2(n+1) where A is the total geographic area of the world or the total area of the map tile grid 10. Because of the numbering system, the exact position of any tile in any level of the map tile grid or projection may be uniquely determined from the tile ID.

In one embodiment, the system 100 may identify a tile by a quadkey determined based on the tile ID of a tile of the map tile grid. The quadkey, for example, is a one-dimensional array including numerical values. In one embodiment, the quadkey may be calculated or determined by interleaving the bits of the row and column coordinates of a tile in the grid at a specific level. The interleaved bits may be converted to a predetermined base number (e.g., base 10, base 4, hexadecimal). In one example, leading zeroes are inserted or retained regardless of the level of the map tile grid to maintain a constant length for the one-dimensional array of the quadkey. In another example, the length of the one-dimensional array of the quadkey may indicate the corresponding level within the map tile grid 10. In one embodiment, the quadkey is an example of the hash or encoding scheme of the respective geographical coordinates of a geographical data point that can be used to identify a tile in which the geographical data point is located.

The geographic database 109 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle 101, a vehicle sensor 107, a UE 115, a device sensor 117, and/or an application 123. The navigation-related functions can correspond to vehicle navigation (e.g., a drone), pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for predicting damage area zones for a vehicle to avoid in case of an accident may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 6:
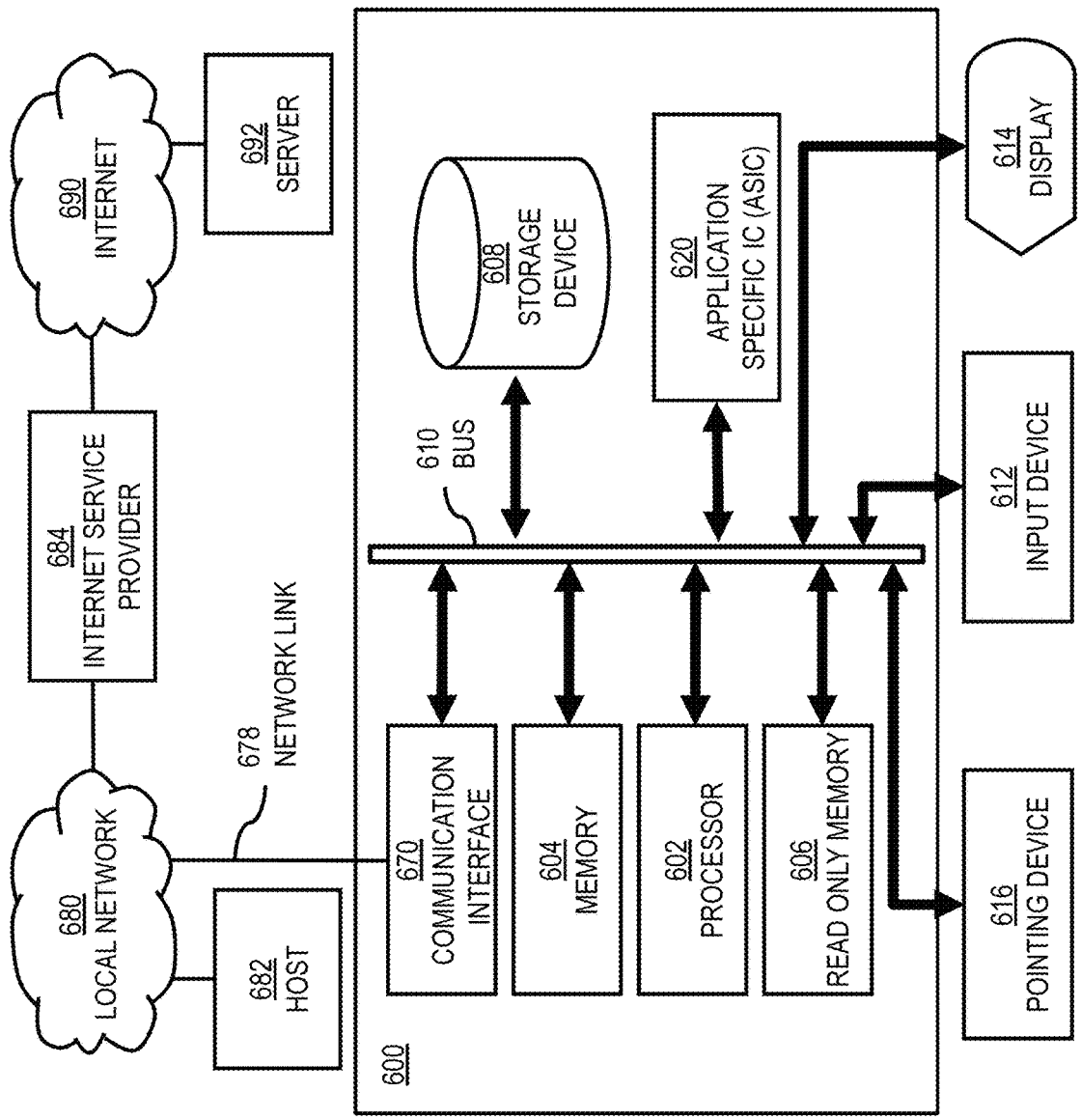
FIG. 6 is a diagram of hardware that can be used to implement example embodiment(s)

FIG. 6 illustrates a computer system 600 upon which example embodiment(s) of the invention may be implemented. Computer system 600 is programmed (e.g., via computer program code or instructions) to predict damage area zones for a vehicle to avoid in case of an accident as described herein and includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 610 includes one or more parallel conductors of information so that information is transferred quickly among devices coupled to the bus 610. One or more processors 602 for processing information are coupled with the bus 610.

A processor 602 performs a set of operations on information as specified by computer program code related to predicting damage area zones for a vehicle to avoid in case of an accident. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 610 and placing information on the bus 610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 600 also includes a memory 604 coupled to bus 610. The memory 604, such as a random-access memory (RANI) or other dynamic storage device, stores information including processor instructions for predicting damage area zones for a vehicle to avoid in case of an accident. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

Information, including instructions for predicting damage area zones for a vehicle to avoid in case of an accident, is provided to the bus 610 for use by the processor from an external input device 612, such as a keyboard containing alphanumeric keys operated by a human user, or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614, such as a cathode ray tube (CRT) or a liquid crystal display (LCD), or plasma screen or printer for presenting text or images, and a pointing device 616, such as a mouse or a trackball or cursor direction keys, or motion sensor, for controlling a position of a small cursor image presented on the display 614 and issuing commands associated with graphical elements presented on the display 614. In some embodiments, for example, in embodiments in which the computer system 600 performs all functions automatically without human input, one or more of external input device 612, display device 614 and pointing device 616 is omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of application specific ICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a one-way or two-way communication coupling to a variety of external devices that operate with their own processors, such as printers, scanners, and external disks. In general, the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends or receives or both sends and receives electrical, acoustic, or electromagnetic signals, including infrared and optical signals, that carry information streams, such as digital data. For example, in wireless handheld devices, such as mobile telephones like cell phones, the communications interface 670 includes a radio band electromagnetic transmitter and receiver called a radio transceiver. In certain embodiments, the communications interface 670 enables connection to the communication network 105 for predicting damage area zones for a vehicle to avoid in case of an accident.

The term computer-readable medium is used herein to refer to any medium that participates in providing information to processor 602, including instructions for execution. Such a medium may take many forms, including, but not limited to, non-volatile media, volatile media, and transmission media. Non-volatile media include, for example, optical or magnetic disks, such as storage device 608. Volatile media include, for example, dynamic memory 604. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization, or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 678 typically provides information communication using transmission media through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690.

A computer called a server host 692 connected to the Internet hosts a process that provides a service in response to information received over the Internet. For example, server host 692 hosts a process that provides information representing video data for presentation at display 614. It is contemplated that the components of system can be deployed in various configurations within other computer systems, e.g., host 682 and server 692.

FIG. 7 illustrates a chip set 700 upon which example embodiment(s) of the invention may be implemented. Chip set 700 is programmed to predict damage area zones for a vehicle to avoid in case of an accident as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively, or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to predict damage area zones for a vehicle to avoid in case of an accident. The memory 705 also stores the data associated with or generated by the execution of the inventive steps.

Figure 8:
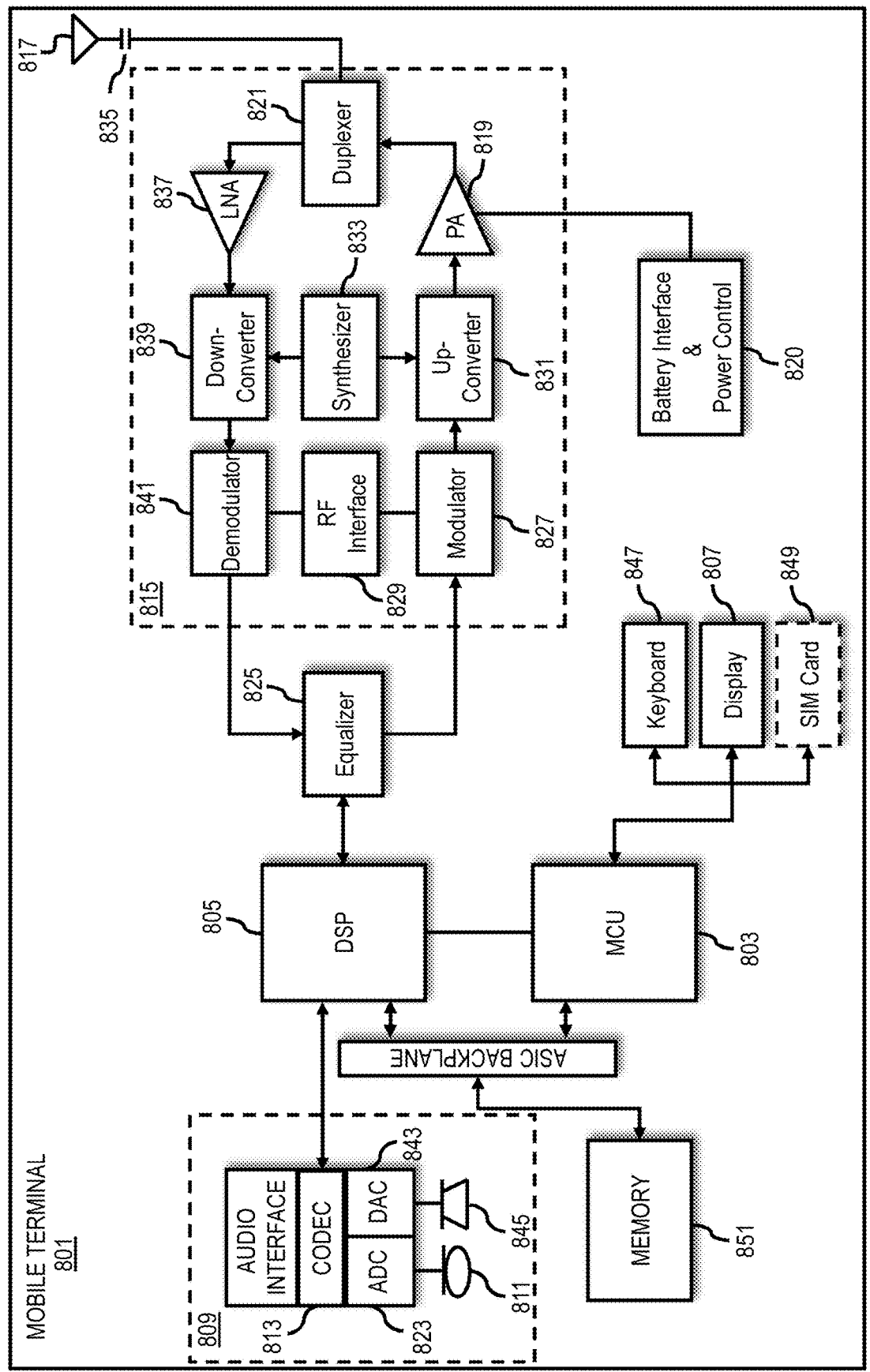
FIG. 8 is a diagram of a mobile terminal (e.g., handset or vehicle or part thereof) that can be used to implement example embodiment(s).

FIG. 8 is a diagram of exemplary components of a mobile terminal 801 (e.g., a UE 101, a vehicle 115, or a component thereof) capable of operating in the system of FIG. 1, according to example embodiment(s). Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile station functions that offer automatic contact matching. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile station 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UNITS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803—which can be implemented as a Central Processing Unit (CPU) (not shown).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile station 801 to predict damage area zones for a vehicle to avoid in case of an accident. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the station. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile station 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 851 may be, but not limited to, a single memory, CD, DVD, ROM, RAM, EEPROM, optical storage, or any other non-volatile or non-transitory storage medium capable of storing digital data.

An optionally incorporated SIM card 849 carries, for instance, important information, such as the cellular phone number, the carrier supplying service, subscription details, and security information. The SIM card 849 serves primarily to identify the mobile station 801 on a radio network. The card 849 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
retrieving property cost data associated with one or more map features of a geographic area;
detecting, by using one or more sensors, one or more vehicles in the geographic area;
determining vehicle cost data for the one or more vehicles, wherein the one or more sensors include an imaging sensor, wherein the one or more vehicles are detected using object recognition from image data captured by the imaging sensor;
processing the image data to determine vehicle strength data, vehicle durability data, or a combination thereof associated with the one or more vehicles;
determining at least one damage area zone in the geographic area based on the property cost data and the vehicle cost data, wherein the at least one damage area zone indicates a zone within the geographic area associated with a property damage value and a vehicle damage value predicted to result from an accident occurring in the zone based on the property cost data, the vehicle cost data, the vehicle strength data, the vehicle durability data, or a combination thereof;
providing the at least one damage area zone as a digital channel output of a geographic database; and
generating a navigation route based on the digital channel output, wherein the navigation route is generated based on a cost function that minimizes the property damage value and the vehicle damage value encountered on the navigation route.

2. The method of claim 1, further comprising:
determining building material data associated with the one or more map features from the geographic database,
wherein the property damage value is further based on the building material data.

3. The method of claim 1, further comprising:
classifying the at least one damage area zone as a maximum damage zone based on determining that the predicted property damage value is above a maximum value threshold or as a minimum damage zone based on determining that the predicted property damage value is below a minimum value threshold,
wherein the digital channel output further includes the maximum damage zone or the minimum damage zone.

4. The method of claim 3, further comprising:
presenting a mapping user interface displaying a representation of the at least one damage area zone, the maximum damage zone, the minimum damage zone, or a combination thereof.

5. The method of claim 1, further comprising:
detecting, by using one or more sensors, one or more people in the geographic area; and
determining people property cost value associated with the one or more people,
wherein the property damage value further includes a people property damage value predicted to result from the accident occurring in the zone based on the vehicle cost data.

6. The method of claim 1, further comprising:
detecting, by using one or more sensors, one or more people in the geographic area; and
assigning a people cost for the one or more people, wherein the property damage value further includes a people damage value that is predicted to result from the accident occurring in the zone based on the people damage value.

7. An apparatus comprising:
at least one processor; and
at least one memory including computer program code for one or more programs,
the at least one memory and the computer program code configured to, with the at least one processor, cause the apparatus to perform at least the following operations:
retrieve property cost data associated within one or more map features of a geographic area;
detect, via one or more sensors, one or more vehicles in the geographic area;
determine vehicle cost data for the one or more vehicles, wherein the one or more sensors include an imaging sensor, wherein the one or more vehicles are detected using object recognition from image data captured by the imaging sensor;
process the image data to determine vehicle strength data, vehicle durability data, or a combination thereof associated with the one or more vehicles;
determine at least one damage area zone in the geographic area based on the property cost data and the vehicle cost data, wherein the at least one damage area zone indicates a zone within the geographic area associated with a property damage value and a vehicle damage value predicted to result from an accident occurring in the zone based on the property cost data, the vehicle cost data, the vehicle strength data, the vehicle durability data, or a combination thereof; and
provide the at least one damage zone as a digital channel output of a geographic database.

8. The apparatus of claim 7, wherein the apparatus is further caused to:
determine building material data associated with the one or more map features from a geographic database,
wherein the property damage value is further based on the building material data.

9. The apparatus of claim 7, wherein the apparatus is further caused to:
classify the at least one damage zone as a maximum damage zone based on determining that the predicted property damage value is above a maximum value threshold or as a minimum damage zone based on determining that the predicted property damage value is below a minimum value threshold,
wherein the digital channel output further includes the maximum damage zone or the minimum damage zone.

10. The apparatus of claim 9, wherein the apparatus is further caused to:
present a mapping user interface displaying a representation of the at least one zone, the maximum damage zone, the minimum damage zone, or a combination thereof.

11. A non-transitory computer-readable storage medium having stored thereon one or more program instructions which, when executed by one or more processors, cause an apparatus to at least perform the following operations:
retrieving property cost data associated within one or more map features of a geographic area;
detecting, by using one or more sensors, one or more vehicles in the geographic area;
determining vehicle cost data for the one or more vehicles, wherein the one or more sensors include an imaging sensor, wherein the one or more vehicles are detected using object recognition from image data captured by the imaging sensor;
processing the image data to determine vehicle strength data, vehicle durability data, or a combination thereof associated with the one or more vehicles;
determining a maximum damage zone, a minimum damage zone, or a combination thereof in the geographic area based on the property cost data and the vehicle cost data, wherein the maximum damage zone, the minimum damage zone, or a combination thereof indicates a zone within the geographic area associated with a property damage value and a vehicle damage value predicted to result from an accident occurring in the zone based on the property cost data, the vehicle cost data, the vehicle strength data, the vehicle durability data, or a combination thereof;
providing the maximum damage zone, the minimum damage zone, or a combination thereof as a digital channel output of a geographic database.

12. The non-transitory computer-readable storage medium of claim 11, wherein the apparatus is further caused to perform:
presenting a mapping user interface displaying a representation of the at least one zone, the maximum damage zone, the minimum damage zone, or a combination thereof.

13. The non-transitory computer-readable storage medium of claim 11, wherein the apparatus is further caused to perform:
generating a navigation route based on the digital channel output.

* * * * *